US010549660B2

(12) United States Patent
Line et al.

(10) Patent No.: US 10,549,660 B2
(45) Date of Patent: Feb. 4, 2020

(54) VEHICLE SEATING ASSEMBLY

(71) Applicant: Ford Global Technologies, LLC, Dearborn, MI (US)

(72) Inventors: Johnathan Andrew Line, Northville, MI (US); Amber LaVerne Hall, Portage, MI (US); Keith Allen Godin, Dearborn, MI (US); Alan George Dry, Grosse Pointe Woods, MI (US); S. M. Akbar Berry, Windsor (CA)

(73) Assignee: Ford Global Technologies, LLC, Dearborn, MI (US)

( * ) Notice: Subject to any disclaimer, the term of this patent is extended or adjusted under 35 U.S.C. 154(b) by 173 days.

(21) Appl. No.: 15/432,051

(22) Filed: Feb. 14, 2017

(65) Prior Publication Data

US 2018/0229632 A1    Aug. 16, 2018

(51) Int. Cl.
*B60N 2/56* (2006.01)
*F25B 21/02* (2006.01)

(52) U.S. Cl.
CPC ......... *B60N 2/5621* (2013.01); *B60N 2/5678* (2013.01); *F25B 21/02* (2013.01); *F25B 2321/00* (2013.01); *F25B 2321/02* (2013.01)

(58) Field of Classification Search
CPC ......... B60N 2/56; B60N 2/5621; F25B 21/02; F25B 21/04; F25B 2321/02
See application file for complete search history.

(56) References Cited

U.S. PATENT DOCUMENTS

| 3,165,620 | A  | 1/1965 | Miller |
| 5,597,200 | A  | 1/1997 | Gregory et al. |
| 5,626,021 | A  | 5/1997 | Karunasiri et al. |
| 5,921,858 | A  | 7/1999 | Kawai et al. |
| 6,079,485 | A  | 6/2000 | Esaki et al. |
| 6,119,463 | A  | 9/2000 | Bell |
| 6,291,803 | B1 | 9/2001 | Fourrey |
| 7,178,344 | B2 | 2/2007 | Bell |

(Continued)

FOREIGN PATENT DOCUMENTS

| CN | 201890168 U | 7/2011 |
| CN | 203651539 U | 6/2014 |

(Continued)

OTHER PUBLICATIONS

DE-10196995-B4 Translation (Year: 2005).*

(Continued)

*Primary Examiner* — Brian M King
(74) *Attorney, Agent, or Firm* — Vichit Chea; Price Heneveld LLP

(57) ABSTRACT

A vehicle seating assembly comprises a body with a center portion and four corner portions and a seating surface. A supporting layer is disposed below the body. A thermal transfer node is disposed in the body. The thermal transfer node includes a heat sink and a thermoelectric device. The heat sink is located between the seating surface and the thermoelectric device. The heat sink and the thermoelectric device are configured to draw heat away from the heating surface. A fluid moves proximate the thermal transfer node and into the supporting layer to draw heat away from the thermal transfer node. A phase change material is disposed between the seating surface and the heat sink.

17 Claims, 7 Drawing Sheets

(56) References Cited

U.S. PATENT DOCUMENTS

| | | |
|---|---|---|
| 7,320,357 B2 | 1/2008 | Pause |
| 7,475,464 B2 | 1/2009 | Lofy et al. |
| 7,640,754 B2 | 1/2010 | Wolas |
| 7,828,050 B2 | 11/2010 | Esaki |
| 8,359,871 B2 | 1/2013 | Woods et al. |
| 8,702,164 B2 | 4/2014 | Lazanja et al. |
| 9,105,808 B2 | 8/2015 | Petrovski |
| 9,105,809 B2 | 8/2015 | Lofy |
| 9,272,647 B2 | 3/2016 | Gawade et al. |
| 9,310,112 B2 | 4/2016 | Bell et al. |
| 9,335,073 B2 | 5/2016 | Lofy |
| 9,366,461 B2 | 6/2016 | Bell et al. |
| 9,403,460 B2 | 8/2016 | Hickey et al. |
| 9,440,567 B2 | 9/2016 | Lazanja et al. |
| 9,468,045 B2 | 10/2016 | Zhang et al. |
| 9,676,310 B2 | 6/2017 | Fitzpatrick et al. |
| 2004/0154784 A1 | 8/2004 | Pause |
| 2006/0087160 A1 | 4/2006 | Dong et al. |
| 2006/0175877 A1 | 8/2006 | Alionte et al. |
| 2006/0208540 A1 | 9/2006 | Lofy et al. |
| 2010/0327637 A1 | 12/2010 | Bajic et al. |
| 2013/0097777 A1 | 4/2013 | Marquette et al. |
| 2015/0069798 A1 | 3/2015 | Bajic et al. |
| 2015/0266405 A1 | 9/2015 | Fitzpatrick et al. |
| 2016/0009206 A1 | 1/2016 | Perraut et al. |
| 2017/0354190 A1* | 12/2017 | Cauchy .................. A47C 7/744 |
| 2018/0056835 A1* | 3/2018 | Konrad ................ H01L 35/325 |

FOREIGN PATENT DOCUMENTS

| | | | |
|---|---|---|---|
| DE | 10196995 B4 * | 10/2005 | ............. F25B 21/02 |
| DE | 102013021199 A1 | 7/2014 | |
| EP | 1723876 A1 | 11/2006 | |

OTHER PUBLICATIONS

Elarusi, Abdulmunaem H., "Optimal Design of a Thermoelectric Cooling/Heating System for Car Seat Climate Control (CSCC)" 2016. Master's Theses. 720, Western Michigan University, ScholarWorks at WMU.

Lee, Dr. Hosung, "Optimal Design of a Thermoelectric Cooling/Heating for a Car Seat Comfort" 2014.

\* cited by examiner

US 10,549,660 B2

VEHICLE SEATING ASSEMBLY

FIELD OF THE DISCLOSURE

The present disclosure generally relates to a vehicle seating assembly, and more particularly to vehicle seating assembly utilizing localized heating and cooling.

BACKGROUND OF THE DISCLOSURE

Vehicle seat comfort has become increasingly important as passengers take longer trips. Providing cooling and heating in the seat can increase the comfort of passengers.

A variety of vehicle seating assemblies that provide for occupant cooling and heating are known. However, current solutions for providing cooled and heated surfaces often can be too bulky to conform to the seats for which they are intended while still being thermally comfortable and providing flexible support for the occupant. It is therefore desirable to provide a seat that flexibly supports the occupant and provides the occupant thermal comfort.

SUMMARY OF THE DISCLOSURE

According to one aspect of the present disclosure, a vehicle seating assembly includes a vehicle seat including a body having a center portion and four corner portions. The vehicle seat also includes a seating surface. A supporting layer is disposed below the vehicle seat body. A thermal transfer node is disposed in the body. The thermal transfer node includes a heat sink and a thermoelectric device. The heat sink is located between the seating surface and the thermoelectric device. The heat sink and the thermoelectric device are configured to draw heat away from the seating surface. A fluid moves proximate the thermal transfer node and into the supporting layer to draw heat away from the thermal transfer node. A phase change material is disposed between the seating surface and the heat sink.

According to another aspect of the present disclosure, a vehicle seating assembly includes a vehicle seat including a body with a seating surface. The vehicle seating assembly also includes a thermal transfer node. The thermal transfer node includes a thermoelectric device. The thermoelectric device is configured to change temperature when a voltage is applied to the thermoelectric device.

According to yet another aspect of the present disclosure, a seating assembly comprises a seat having a body. The body has a seating surface and a rear surface. A plurality of columns extend between the seating surface and the rear surface. The columns are proximate a thermoelectric device, an upper heat sink, and a lower heat sink. The upper heat sink is located between the thermoelectric device and the seating surface. The lower heat sink is located between the thermoelectric device and the rear surface. The upper heat sink and the lower heat sink are in a thermally conductive relationship with the thermoelectric device. A supporting layer is proximate the rear surface. The columns are proximate a structure for directing fluid flow into the rear surface, along the lower heat sink, and into the supporting layer.

These and other aspects, objects, and features of the present disclosure will be understood and appreciated by those skilled in the art upon studying the following specification, claims, and appended drawings.

DETAILED DESCRIPTION OF THE PREFERRED EMBODIMENTS

Figure 1:
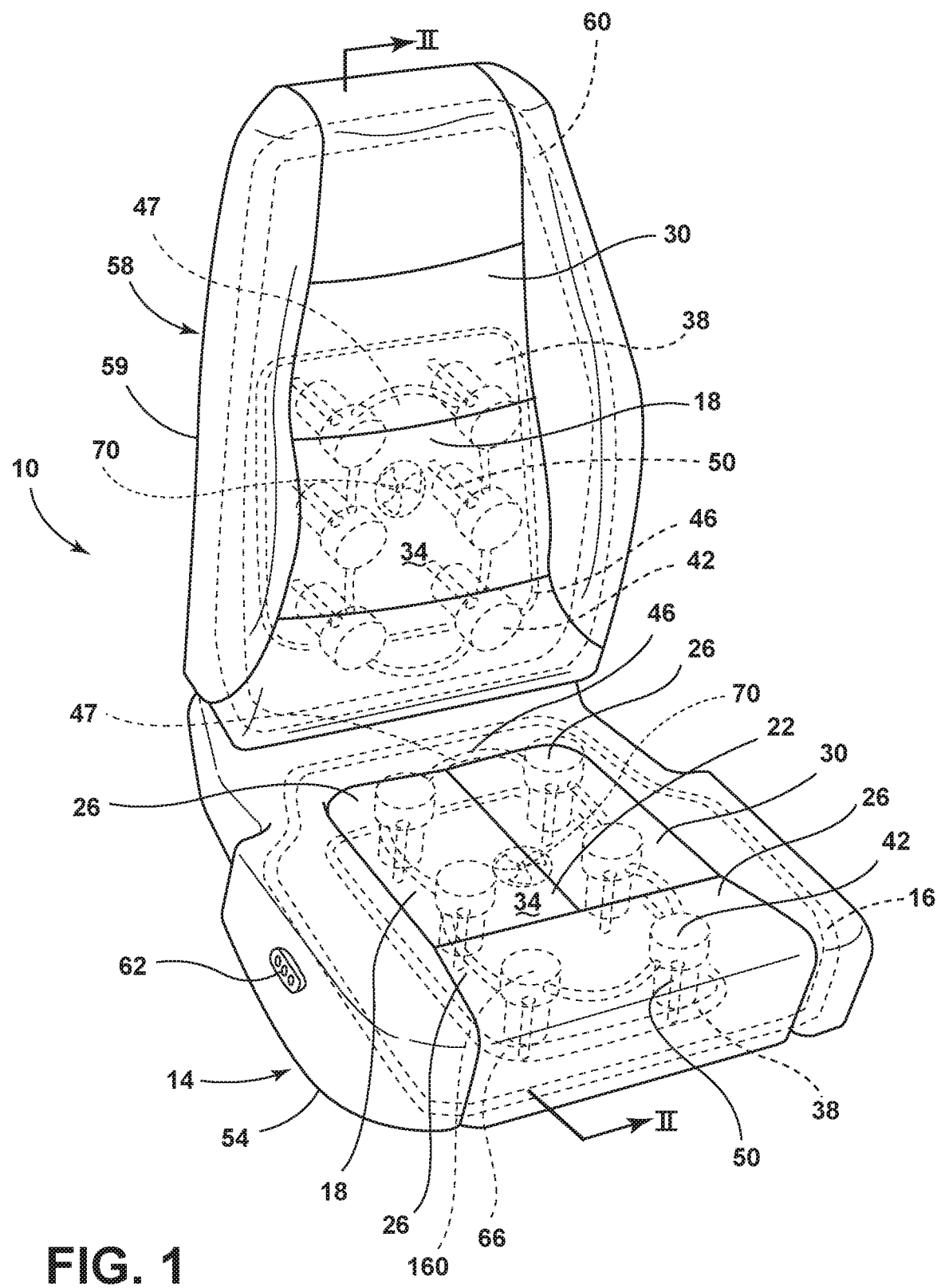
FIG. 1 is a front perspective view of the vehicle seating assembly of one embodiment of the present disclosure.

Referring to the embodiment generally illustrated in FIGS. 1-5A, a vehicle seating assembly 10 includes a body 18 having a center portion 22 and four corner portions 26. The vehicle seat 14 further includes a seating surface 34. A supporting layer 38 is disposed below the body 18. A thermal transfer node 160 is disposed in the body 18 and includes an upper heat sink 132 and a thermoelectric device 136. The upper heat sink 132 is located between the seating surface 34 and the thermoelectric device 136. The upper heat sink 132 and the thermoelectric device 136 are configured to draw heat away from the seating surface 34. A fluid moves proximate the thermal transfer node 160 and into supporting layer 38 to draw heat away from the thermal transfer node 160. A phase change material 125 is disposed in patch 124 between the seating surface 34 and the upper heat sink 132. The phase change material 125 absorbs heat.

Figure 2:
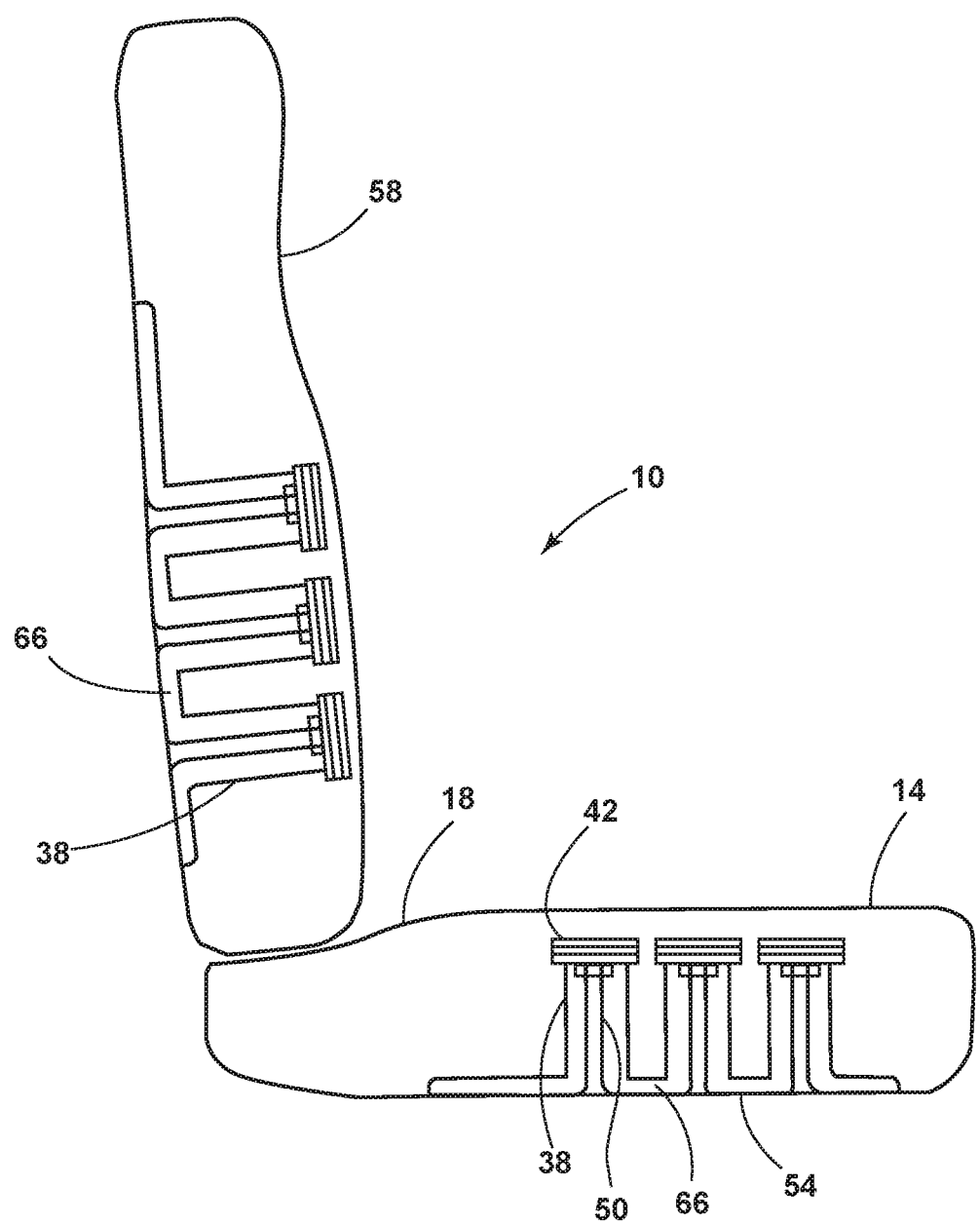
FIG. 2 is a cross-sectional view of the vehicle seating assembly along 2-2 of FIG. 1 of one embodiment of the present disclosure.
Figure 3:
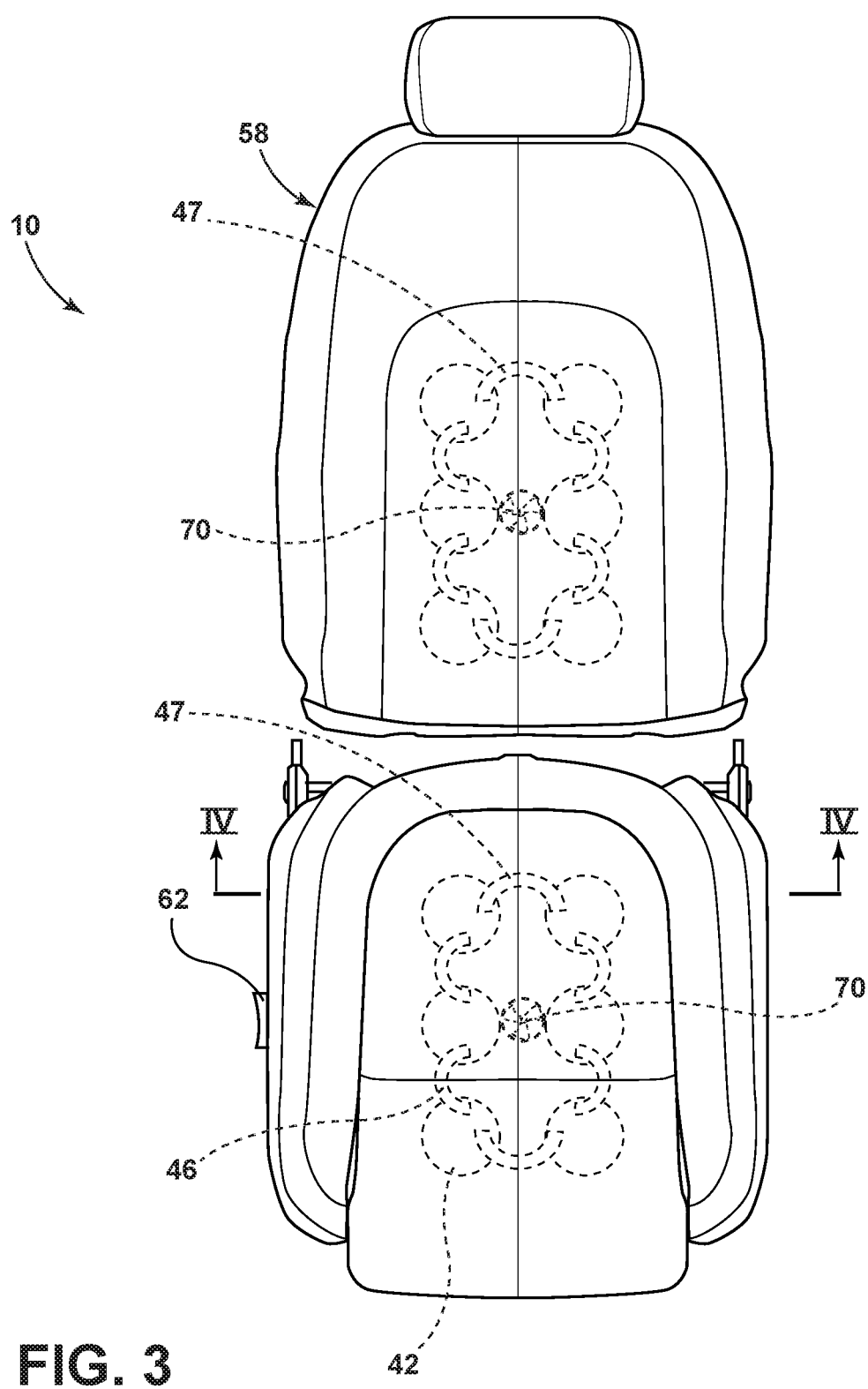
FIG. 3 is a front view of the vehicle seating assembly of one embodiment of the present disclosure.

Referring to FIGS. 1-3, the vehicle seating assembly 10 includes a vehicle seat back 58 in addition to the vehicle seat 14, both of which are configured to use with the seat temperature control system 62. The vehicle seat 14 and the vehicle seat back 58 are each generally supported by frame 16 and frame 60, respectively. As is known in the art, the seat 14 frame 16 is generally attached to a vehicle. The body 18 may include a cushion or foam block construction. In the depicted embodiment, body 18 includes core assemblies 42 that are integrated into the body 18.

Strips 46 connect the core assemblies 42 to one another in a general rectangular configuration to form assembly 47. Each core assembly 42 is connected to supporting layer 38. Tubes 50 extend through body 18 of seat 14 from the rear 54 of seat 14 to the thermal transfer node 160 areas of core assemblies 42. In one embodiment, assembly 47 is flexibly resilient and configured to move or adjust in the vehicle seat 14 and/or the vehicle seat back 58 under the weight of an occupant.

With reference to FIGS. 1-5A, the supporting layer 38 is generally positioned proximate the rear 54 of the vehicle seat 14 and the rear 59 of the vehicle seat back 58. It is contemplated that the supporting layer 38 may be connected to the seat 14 and the seat back 58 through a variety of different connecting arrangements, including, but not limited to, adhesive, mechanical fasteners, heat staking, etc.

Regardless of the manner of attachment, inner volume 66 of the supporting layer 38 may be in communication with a fluid mover 70.

The vehicle seat back 58 may include all or some of the same functionality as disclosed herein in relation to the vehicle seat 14. The vehicle seat back 58 is generally configured to rotate relative to the vehicle seat 14 over a wide range of motions to provide comfort to a seated occupant. Unfortunately, when temperature and atmospheric conditions are not ideal, the vehicle seat 14 and seat back 58 may be uncomfortably warm or cold, such that the vehicle seating assembly 10 is not provided for comfortable transit in a vehicle. Accordingly, providing the seat temperature control system 62, as generally set forth in FIGS. 1-5A, readily changes the temperature at an interface between the occupant and the vehicle seating assembly 10, and in particular, between the occupant and the vehicle seat 14 and the vehicle seat back 58, thus providing for a more pleasant traveling experience for the occupant.

With reference to FIGS. 1-5A, in the depicted embodiment the fluid mover 70 is configured to draw air into the supporting layer 38, or alternatively, blow air from the supporting layer 38.

Figure 4:
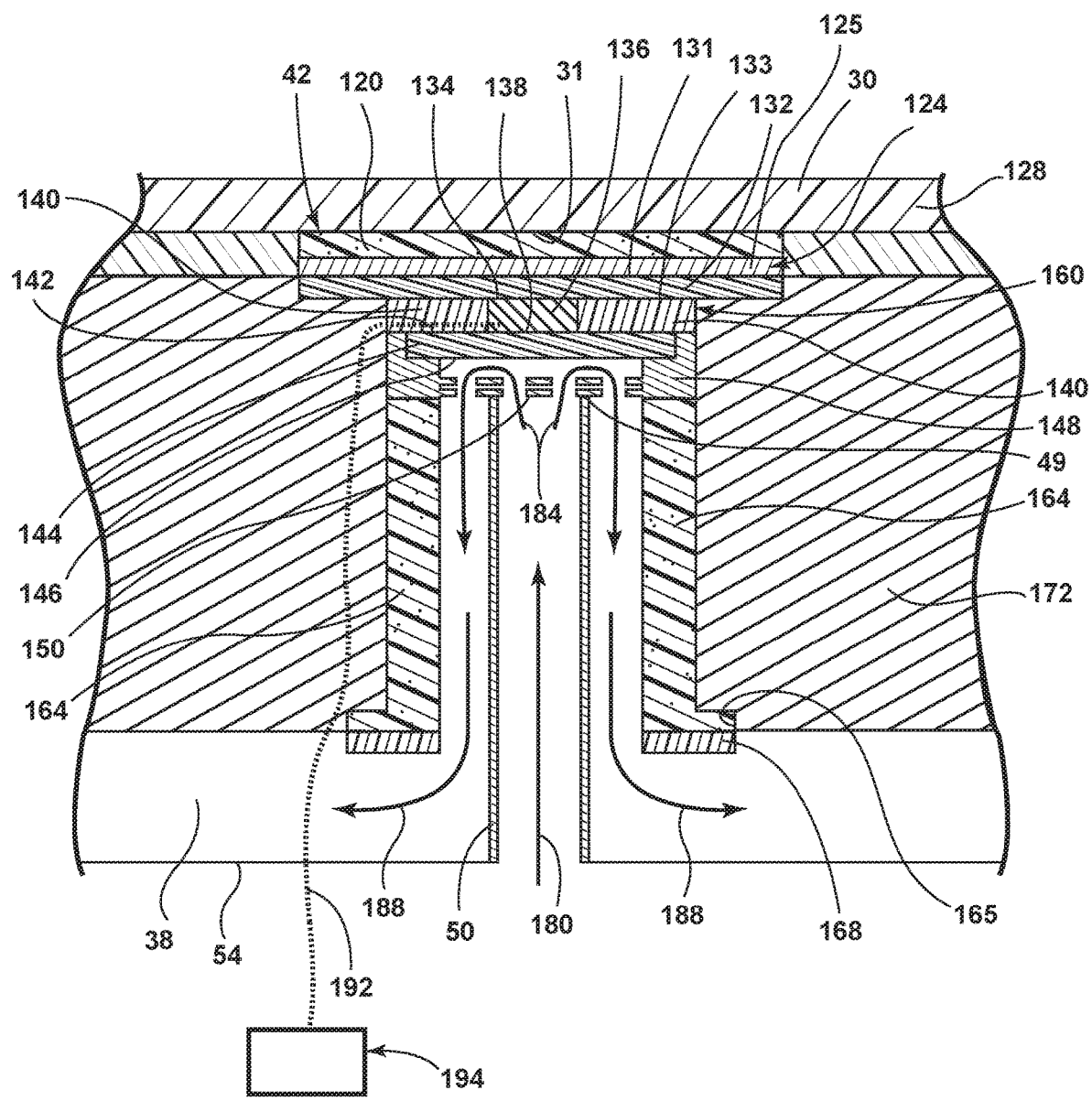
FIG. 4 is a cross-sectional view of the vehicle seating assembly along 4-4 of FIG. 3 of one embodiment of the present disclosure.
Figure 5:
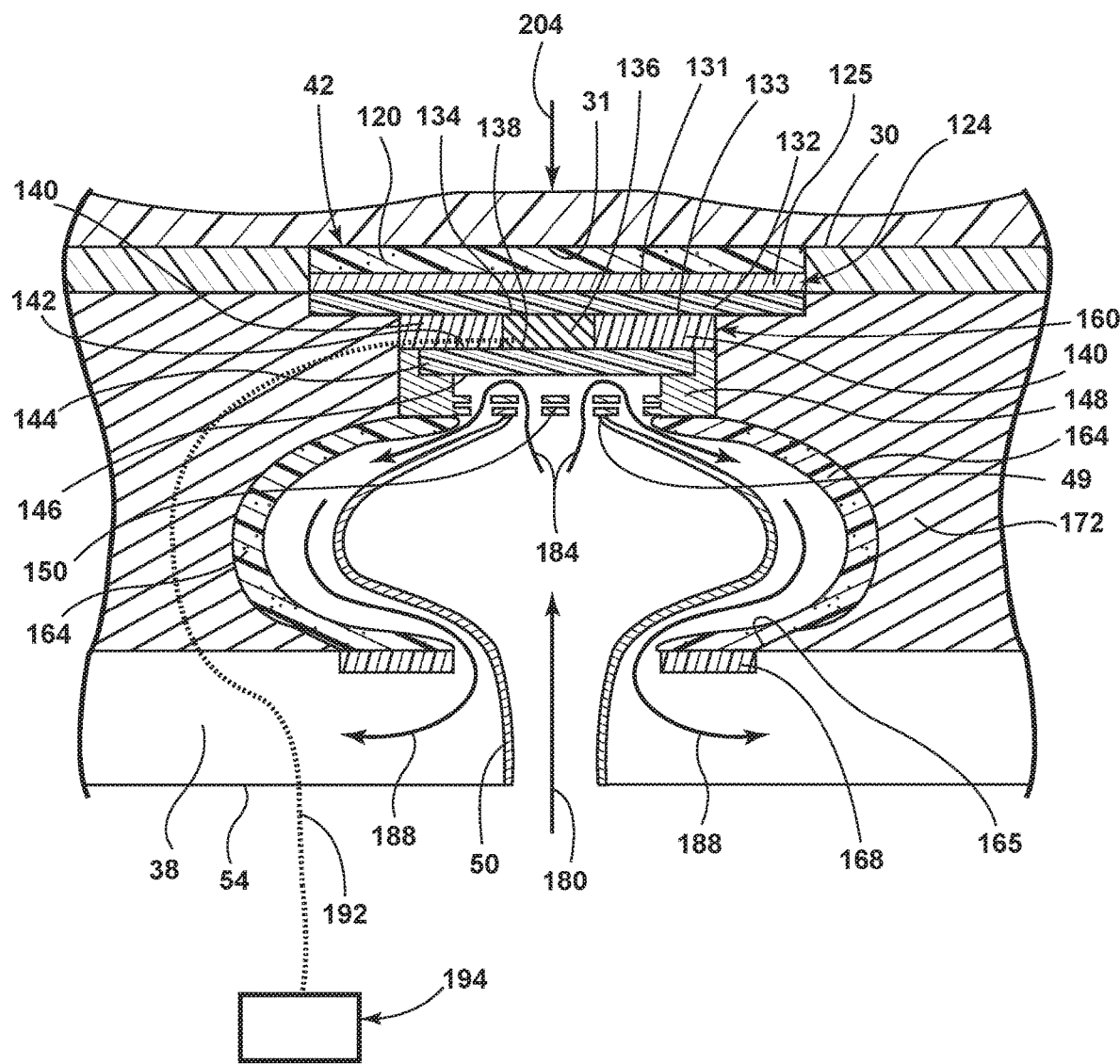
FIG. 5 is a view of FIG. 4 with a downward force applied to show the compression of the structure shown in FIG. 4.

With reference to FIGS. 4 and 5, each figure depicts a cross-section of a core assembly 42 located in seat 14 and/or seat back 58. In the depicted embodiment, each core assembly 42 includes: conductive patch 120, phase change material 125 patch 124, thermal transfer node 160 (comprising upper heat sink 132, thermoelectric device 136, lower heat sink 144, and insulator 140), carrier 148, and column 164. Core assembly 42 and column 164 within core assembly 42 extend between the seating surface 34 and the seat 14 rear 54. Connection 168 attaches core assembly 42 to supporting layer 38. Trim cover 30 is located at the seating surface 34 of the seat 14. Conductive patch 120 is below trim cover 30. Phase change material 125 patch 124 is below conductive patch 120. Conductive patch 120 and the phase change material 125 patch 124 replace the trim lamination 128 where the core assemblies 42 are located. Conductive patch 120 may be a thermally conductive patch. Conductive patch 120 may comprise a high thermal conductivity foam material that may be made of diamond, graphite, aluminum, or copper material.

Upper heat sink 132 is located beneath phase change material 125 patch 124. Upper heat sink 132 has an upper surface 131 and a lower surface 133. Insulator 140 houses the thermoelectric device 136 and separates the upper heat sink 132 and the lower heat sink 144. Insulator 140 holds the thermoelectric device 136 in place between the upper heat sink 132 and the lower heat sink 144. Carrier 148 holds the thermal transfer node 160 in place above column 164. Insulator 140 mounts into carrier 148. In one embodiment, the thermal transfer node 160 may comprise upper heat sink 132, thermoelectric device 136, insulator 140, and lower heat sink 144. Lower heat sink 144 has an upper surface 142 and a lower surface 146. In one embodiment, upper heat sink 132 and lower heat sink 144 are made of conductive copper. Upper heat sink 132 and lower heat sink 144 may also be made of another conductive metal such as aluminum. In the depicted embodiment, upper heat sink 132 has a disc shape and lower heat sink 144 also has a disc shape. In the depicted embodiment, upper heat sink 132 is larger than lower heat sink 144. Upper heat sink 132 and lower heat sink 144 may be made of a variety of different shapes, and upper heat sink 132 and lower heat sink 144 may be of varying or identical sizes in relation to one another. Upper heat sink 132 and lower heat sink 144 may be a sand dollar shape to increase conductive surface area. Upper heat sink 132 and lower heat sink 144 may also be heat sinks such as aluminum fins.

Phase change material 125 patch 124 may comprise a phase change material 125 such as a paraffin, a salt hydrate, a eutectic, and/or any other material known in the art. The phase change material 125 patch 124 in the seat temperature control system 62 works with the thermoelectric device 136 to cool or heat the occupant. A phase change material 125 is a material that may be tuned to change phase at a specified or desired temperature. The phase change material 125 absorbs heat when it changes from solid to liquid. The phase change material 125 absorbs heat until the tuned temperature of the phase change material 125 is reached. At that point the phase change material 125 begins to melt but continues to absorb heat. When phase change materials reach the temperature at which they change phase (i.e., melting point when they are absorbing heat), they absorb large amounts of heat at an almost constant temperature. The phase change material 125 continues to absorb heat until all the material is transformed to the liquid phase.

Conversely, the phase change material 125 releases heat when it changes from liquid to solid. When the temperature around a liquid material falls, the phase change material 125 solidifies, releasing its stored latent heat.

The phase change material 125 for the seat temperature control system 62 patch 124 is selected based upon evaluation of occupant wants and needs. Some phase change materials are very effective in the human comfort range between 20-37 degrees Celsius. Some phase change materials have one or more of the following properties: (1) a substantially reversible freeze/melt cycle, (2) minimal degradation after a large number of freeze/melt cycles, and (3) encapsulation capability since the phase change material changes from solid to liquid and liquid to solid in thermal cycling.

Patch 124 comprises phase change material 125. The phase change material 125 may be available in encapsulated packaging or other packaging known in the art. The phase change material 125 may be encapsulated in a material that is chemically compatible with room temperature phase change materials such that the encapsulating material may be a polypropylene, polyolefin, stainless steel, or other material known in the art. In another embodiment, the phase change material 125 may also be present in a thermal composite format or in a foam. In various embodiments, the phase change material 125 may be utilized without being contained in patch 124.

The thermoelectric device 136 is a thermoelectric module that comprises pairs of P-type and N-type semi-conductor thermoelement forming thermocouples which are connected electrically in series and thermally in parallel. A standard module comprises thermocouples connected in series and sandwiched between two ceramic plates. By applying a current to the module one ceramic plate is heated while the other is cooled. The direction of the current determines which plate is cooled. The number and size of the thermocouples as well as the materials used in the manufacturing determine the cooling capacity.

To transfer heat away from the occupant, the thermoelectric device 136 current runs from positive to negative as it flows from the upper surface 134 to the lower surface 138 of the thermoelectric device 136. The phase change material 125 patch 124 is located near the cold upper surface 134 of the thermoelectric device 136. The phase change material 125 may crystalize due to its proximity to the cold upper surface 134 of the thermoelectric device 136. The phase change material 125 is a thermal conductor in liquid and solid states.

The thermoelectric device 136 draws the heat from the upper heat sink 132 to the lower heat sink 144. Air flows 180, 184, and 188 then carry the hot air mass into the supporting layer 38.

In one embodiment, the phase change material 125 changes from a solid to a liquid when it absorbs heat. When the phase change material 125 changes from a solid to a liquid, the occupant feels a cooling effect. Additionally, when the phase change material 125 changes from a solid to a liquid, the occupant may also perceive wetness.

Conversely, to heat the occupant the thermoelectric device 136 current runs from negative to positive as it flows from the upper surface 134 to the lower surface 138 of the thermoelectric device 136. The phase change material 125 patch 124 becomes warm due to its proximity to the hot upper surface 134 of the thermoelectric device 136. The phase change material 125 may liquefy due to its proximity to the hot upper surface 134 of the thermoelectric device 136. The phase change material 125 is a thermal conductor in liquid and solid states.

The thermoelectric device draws heat from the lower heat sink 144 to the upper heat sink 132. Airflows 180, 184, 188 carry air along the lower heat sink 144. Thermoelectric device 136 takes the low energy in airflows 180, 184 and increases the energy in the airflows to make air above the thermoelectric device 136 warmer than air below the thermoelectric device 136.

In response to the direction of the flow of current across thermoelectric device 136, upper heat sink 132 draws heat away from the occupant or draws heat toward the occupant. The upper surface 131 of upper heat sink 132 is close to seating surfaces 34. The size and shape of upper surface 131 of upper heat sink 132 determine where on seating surfaces 34 the upper heat sink 132 will draw heat from the occupant or direct heat toward the occupant.

It is to be understood by those of skill in the art that adhesives are located between the components of core assembly 42 to secure the components. The adhesives may be thermally and/or electrically conductive. A thermoelectric paste may sandwich the thermoelectric device 136 between the upper heat sink 132 and the lower heat sink 144.

In the depicted embodiment, the carrier 148 is a ventilated rigid disc that supports thermal transfer node 160 on top of the column 164. The carrier 148 also supports the thermal transfer node 160 on top of the tube 50. Column 164 is attached to supporting layer 38 at connection 168. Column 164 may comprise a conductive material that may be a conductive foam. In the depicted embodiment, column 164 has cylindrical walls that are compressible. Column 164 may be a high thermal conductivity foam material made of diamond, graphite, aluminum, or copper material. In one embodiment, column 164 may be made of the same material as conductive patch 120. Electrical wires 192 from the rear 54 portion of the seat 14 connect the positive and negative electrodes of thermoelectric device 136 to power source 194 to provide the thermoelectric device 136 power. Power source 194 may be in a hub for seat power connections. The core assembly 42 depicted in FIG. 4 is located in the body 18 of seat 14. The core assembly 42 depicted in FIG. 4 is also located in the body 18 of seat back 58. Electrical wires from the rear 59 portion of the seat back 58 connect the positive and negative electrodes of thermoelectric device 136 to a power source 194 or another seat power source.

Figure 5A:
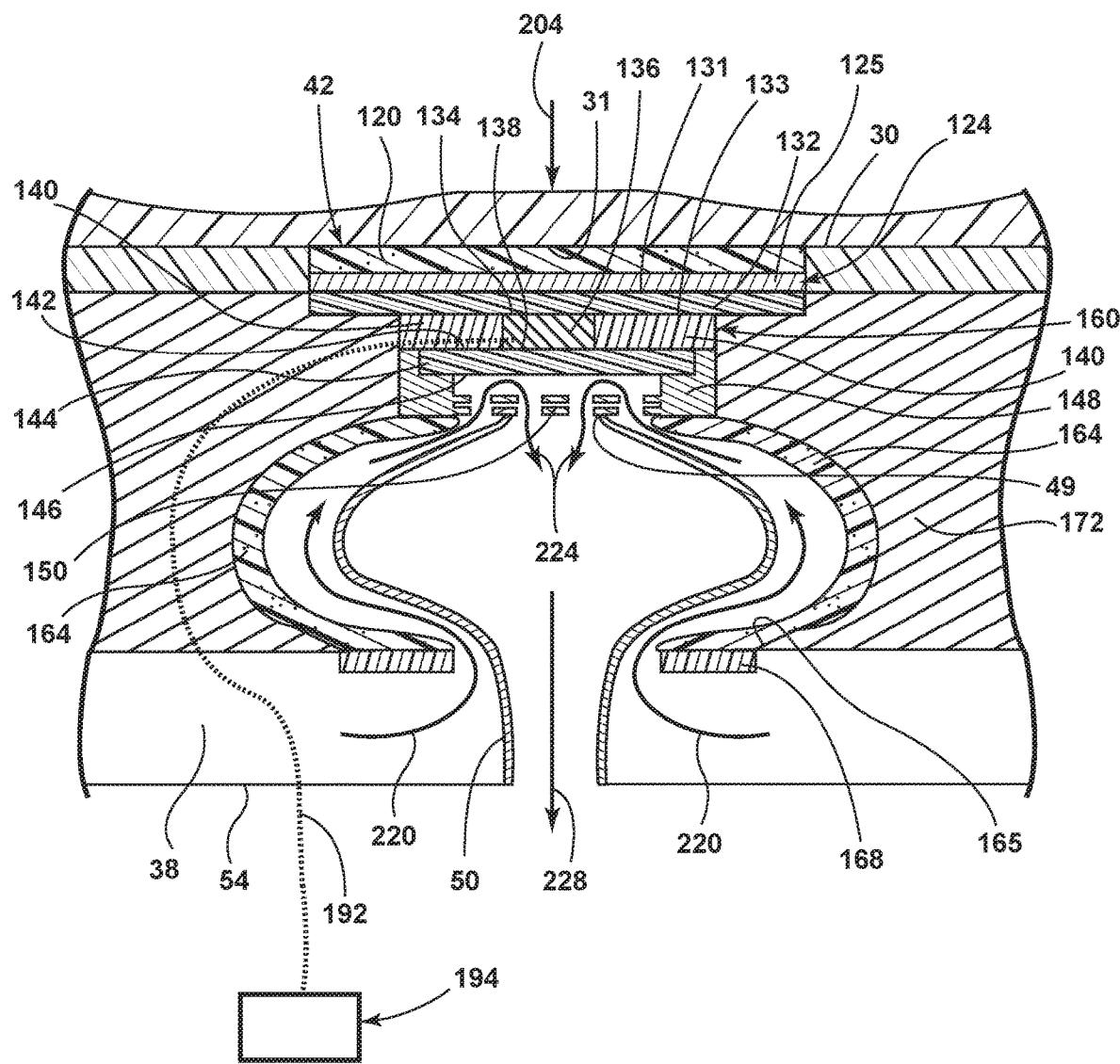
FIG. 5A is a view of FIG. 4A with a downward force applied to show the compression of the structure shown in FIG. 4.

As shown in FIGS. 4-5A, in the depicted embodiment, column 164 includes ring 165. Ring 165 of column 164 abuts the supporting layer 38 and is connected to supporting layer 38 by connection 168. Ring 165 of column 164 provides structural support to the column 164 and the core assembly 42. Connection 168 may be a perforated adhesive, an adhesive, Velcro, or another connection. Foam 172 surrounds the core assembly 42.

Referring to FIG. 5, arrow 204 depicts the occupant's weight on the seating surface 34 and the resultant compression of the body 18 area of a representative core assembly 42 of the seat 14. In the depicted embodiment, the carrier 148 is firmly attached to the insulator 140. The carrier 148 transmits compressive loads down tube 50, which acts as a compressive structural support to the portions of the core assembly 42 that are above tube 50. The portions of the core assembly 42 above tube 50 include the conductive patch 120, phase change material 125 patch 124, thermal transfer node 160 (comprising upper heat sink 132, thermoelectric device 136, lower heat sink 144, and insulator 140), and carrier 148. The carrier 148 is partially closed at its lower end by vents 150. The vents 150 can carry light structural loads applied to them by the top end 49 of the tube 50. The vent 150 puts the top end 49 of the tube 50 at a constant distance from the lower heat sink 144. The body 18 area of seat back 58 and the core assemblies 42 in the seat back are also subject to some compression from the occupant.

Referring again to FIGS. 1-3, the arrangement of the core assemblies 42 and the strips 46 in assembly 47 in each of the seat 14 and the seat back 58 enables degrees of freedom to support occupant seating comfort and multi-directional movement of assembly 47 within the seat 14. Assemblies 47 are located in areas of the seat 14 and seat back 58 that contact sensitive areas of the body. The independent, but interconnected flexible thermal transfer nodes 160 have multi-directional movement within the seat 14 or seat back 58 to maintain comfort relative to an occupant's body shape. The assembly 47 enables multi-directional movement. The generally rectangular configuration of assembly 47 enables multiple degrees of freedom to support seat comfort and multi-directional movement.

In other embodiments, strips 46 may be linked to the thermal transfer nodes 160 to provide thermal and/or electrical conductivity between the nodes 160. Each thermal transfer node 160 is interconnected by a flexible and adapted support member geometry to allow for multi-directional movement. Though the embodiment disclosed in the drawings depicts a generally rectangular configuration of assembly 47, other configurations are envisioned with one or more core assemblies 42 and one or more strips 46. In one embodiment, assembly 47 may consist of a plurality of core assemblies 42 that are not connected to one another by strips 46.

In one embodiment, strips 46 may be made of conductive metal copper. Strips 46 may also be made of another conductive metal such as aluminum. Additionally, strips 46 may be made of a non-metallic material. Strips 46 may be serpentine electrical and/or thermal conductors that are able to accommodate all lateral extensions due to planar forces and deep indentations (for example, due to knee loads) without leaving their elastic range.

The selection of strips 46 is based upon how much the thermal transfer node 160 area will deflect when a strip 46 deflects. Strips 46 are designed with the appropriate amount of slack so that when strips 46 are deflected the thermal transfer node 160 area is not unduly deflected. The strips 46 have slack to accommodate the flexible movement of assemblies 47 in seat 14 and seat back 58. The strips 46 are made of a predetermined length to account for deflection of the vehicle seat. According to one embodiment, the strips may deflect 15 cm or less from the neutral position.

Modular assembly capability to traditional seat back and cushion foam pads to make assembly easier and more cost effective to existing seat value chains is also envisioned. The core assemblies 42 may be designed so that they are inserted into cavities in the foam 172 seat 14 body 18 and/or seat back 58 body 18 for modular use during the seat assembly process. The core assemblies 42 may be inserted into the cavities in a direction from the seating surface 34 to the seat 14 rear 54 and/or the seating surface 34 to the seat back 58 rear 59. Alternatively, the core assemblies 42 may protrude upward from the supporting layer 38. During the assembly process foam 172 seat 14 body 18 with recesses for core assemblies 42 may be placed onto the supporting layer 38 with protruding core assemblies 42. Similarly, foam 172 seat back 58 body 18 with recesses for core assemblies 42 may be placed on to the supporting layer 38 with protruding core assemblies 42.

The seat temperature control system 62 is activated to regulate the temperature of the seating assembly 10. The seat temperature control system 62 may cool or heat the occupant. The occupant's buttocks and legs are cooled or heated by assembly 47 in seat 14. The occupant's back is cooled or heated by assembly 47 in seat back 58.

To cool the occupant, the controls in the vehicle seating assembly 10 seat temperature control system 62 cause current to flow across thermoelectric device 136 in a positive to negative direction from the upper surface 134 of thermoelectric device 136 to the lower surface 138 of thermoelectric device 136. This current draws heat from the upper surface 134 of the thermoelectric device 136 to the lower surface 138 of the thermoelectric device 136. As the thermoelectric device 136 cools the occupant by drawing heat away from the occupant and seating surface 34, the thermoelectric device 136 draws heat from the upper heat sink 132. The chilled upper heat sink 132 near the thermoelectric device 136 and the cold upper surface 134 of thermoelectric device 136 may cause phase change material 125 in patch 124 to crystalize. Phase change material 125 patch 124 may absorb heat from its adjacent element, the conductive patch 120. In the depicted embodiment, the conductive patch 120 replaces the regular topper pad foam of the seat to chill the underside 31 of trim cover 30.

Figure 4A:
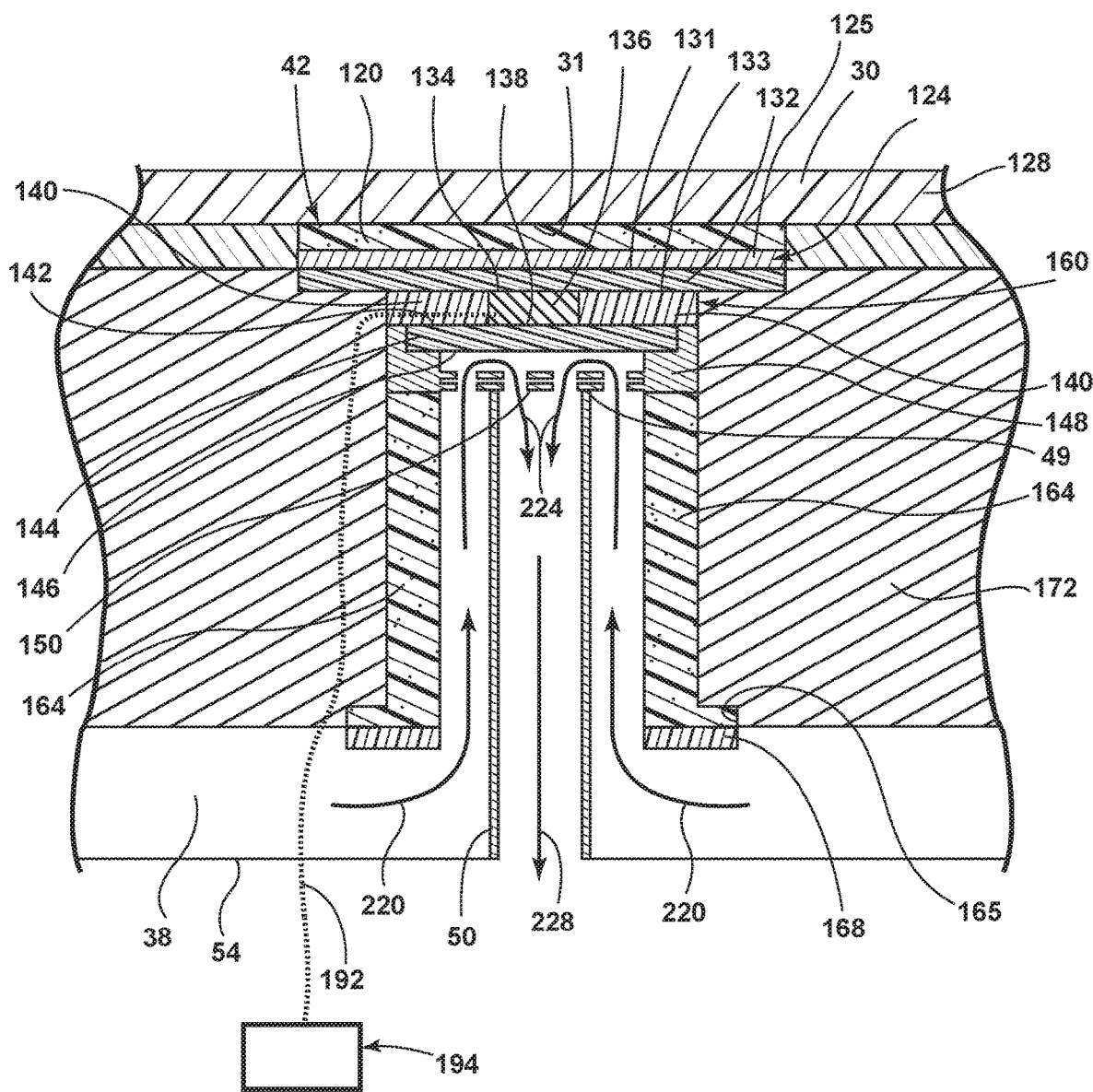
FIG. 4A is a cross-sectional view of the vehicle seating assembly along 4-4 of FIG. 3 of another embodiment of the present disclosure.

Thus, heat is drawn from the occupant, through trim cover 30, and through the various layers of the conductive patch 120, phase change material 125 patch 124, upper heat sink 132 by thermoelectric device 136. The lower heat sink 144 absorbs the heat from thermoelectric device 136. To carry the heat away from the lower surface 146 of lower heat sink 144, ambient airflow 180 enters tube 50. Airflow 184 travels along the lower surface 146 of lower heat sink 144 and is drawn down alongside tube 50 and continues into supporting layer 38. The fluid mover 70 draws airflows 188 toward it. Fluid mover 70 expels air from supporting layer 38. Supporting layer 38 has a low loss lateral airflow capability. As the airflows 184 pass lower heat sink 144, airflows 184 are impinged against the hot lower heat sink 144 lower surface 146. Heated airflow 184 leaves the lower heat sink 144 lower surface 146. Fluid mover 70 expels the air from the supporting layer 38. With reference to FIGS. 4A and 5A, in another embodiment, the airflows 220, 224, and 228 could work in the reverse direction. The airflow 220 could be drawn into the supporting layer 38 by the fluid mover 70. The airflow 224 could then travel along the lower surface 146 of lower heat sink 144 and out of the tube 50 as airflow 228 into the ambient atmosphere.

By way of example, when an occupant enters a vehicle on a hot day, the occupant may use seat temperature control system 62 to cool seat assembly 10. The thermoelectric device 136 current runs from positive to negative as it flows from the upper surface 134 to the lower surface 138 of the thermoelectric device 136. The phase change material 125 that may have been a liquid before temperature control system 62 was activated may become a solid while heat is drawn from the occupant. A solid phase change material 125 works as a thermal conductor. The cold upper surface 134 of thermoelectric device 136 thus may cool a liquid phase change material 125 until it becomes a solid.

To heat the occupant, the controls in the vehicle seating assembly 10 seat temperature control system 62 cause current to flow across the thermoelectric device 136 in a negative to positive direction from the upper surface 134 of the thermoelectric device 136 to the lower surface 138 of thermoelectric device 136. Heat flows from the lower surface 138 of the thermoelectric device 136 to the upper surface 134 of the thermoelectric device 136. As the thermoelectric device 136 heats the occupant by drawing heat toward the occupant and seating surface 34, the thermoelectric device 136 transfers heat to the upper heat sink 132. The phase change material 125 may change from a solid to a liquid due to its proximity to the hot upper surface 134 of thermoelectric device 136. In the depicted embodiment, the conductive patch 120 replaces the regular topper pad foam of the seat to heat the underside 31 of trim cover 30.

Thus, heat is drawn towards the occupant, through upper surface 134 of thermoelectric device 136, upper heat sink 132, phase change material 125 patch 124, conductive patch 120, and trim cover 30. Low energy airflow 180 enters tube 50, as depicted by airflow 180. Low energy airflow 184 is shown moving along the lower surface 146 of lower heat sink 144 and is drawn down alongside tube 50 and continues into supporting layer 38. The fluid mover 70 draws airflow 188 toward it. Fluid mover 70 expels air from supporting layer 38. Supporting layer 38 has a low loss lateral airflow capability. As the airflows 184 pass lower heat sink 144, airflows 184 are impinged against the lower heat sink 144 lower surface 146. Thermoelectric device 136 takes the low energy in airflows 180, 184 and increases the energy in the airflows to make air above the thermoelectric device 136 warmer than below the thermoelectric device 136. Airflow 184 leaves the lower heat sink 144 lower surface 146. Fluid mover 70 expels the airflow 188 from the supporting layer 38. With reference to FIGS. 4A and 5A, in another embodiment, the heating airflows 220, 224, and 228 could work in the reverse direction. Fluid mover 70 could draw air into the supporting layer 38. The air could leave the supporting layer as airflows 220, 224, and 228. The low energy airflow 224 could then travel along the lower surface 146 of lower heat sink 144 and out of the tube 50 as airflow 228 into the atmosphere.

For example, when an occupant enters a vehicle on a cold day, the occupant may use seat temperature control system 62 to heat seat assembly 10. The thermoelectric device 136 current runs from negative to positive as it flows from the upper surface 134 to the lower surface 138 of the thermoelectric device 136. The phase change material 125 that may have been a solid before temperature control system 62 was activated may become a liquid while heat is transferred toward the occupant. The phase changer material 125 is located proximate to the hot upper surface 134 of thermoelectric device 136. A liquid phase change material 125 works as a thermal conductor.

The seat temperature control system 62 may function with or without a phase change material 125 to draw heat from or to draw heat toward the occupant.

The seat temperature control system 62 may activate only the thermoelectric device(s) 136 in the seat 14, only the thermoelectric device(s) in the seat back 58, or both the thermoelectric devices in the seat 14 and the seat back 58.

It is to be understood that use of airflows 180, 184, 188 in one embodiment and use of airflows 220, 224, 228 in another embodiment may be modified to enhance the cooling or heating of the occupant.

The tube 50 and column 164 for delivering airflows 180, 184, 188 and 220, 224, 228 to the thermal transfer node 160 may be different than that in the depicted embodiment. Column 164 may be a different shape (for example, a cone) or size. Tube 50 may be replace by an alternate routing structure (for example, a cone-shaped structure). Alternatively, the design of the area between the supporting layer 38 and thermal transfer node 160 may not include a structure.

The vent 150 puts the top end 49 of the tube 50 at a constant distance from the lower heat sink 144 to impinge air on the lower surface 146 of lower heat sink 144 to allow the heated air to be drawn away from the airflow 188 of the laterally ventilated supporting layer 38.

In one embodiment, the core assembly 42 may increase the efficiencies of heat transfer elements by employing high heat transfer materials for increased heat transfer (for example trim cover 30, conductive patch 120, phase change material 125 patch 124, upper heat sink 132, lower heat sink 144, column 164, and connection 168).

In another embodiment of the vehicle seating assembly 10, seat temperature control system 62 functions to draw heat from or direct heat toward the occupant without any phase change material 125 and without phase change material 125 patch 124. In another embodiment, the system functions to draw heat from or direct heat toward the occupant without the phase change material 125, without phase change material 125 patch 124, and without the conductive patch 120. Phase change material 125 and phase change material 125 patch 124 may be removed from the seat temperature control system 62 so that the seat temperature control system 62 functions to draw heat from or direct heat toward the occupant without any phase change material.

In another embodiment, solid state heat pumps using a thermoelectric effect may be used in place of the thermoelectric device 136. A two directional heat pump may use ambient air applied to its lower surface to heat or cool its upper surface.

A variety of advantages may be derived from the use of the present disclosure. An occupant is able to control the cooling or heating of the seat 14 and the seat back 58. The cooling and heating systems are integrated into one system 62. The assemblies 47 are comfortable and supportive. Assemblies 47 adjust to the load applied to the vehicle seating assembly 10 by the occupant so that the occupant enjoys a comfortable ride. Also, assemblies 47 and/or core assemblies 42 may be prepared for modular use in the vehicle seating assembly 10.

It is to be understood that variations and modifications can be made on the aforementioned structure without departing from the concepts of the present invention, and further it is to be understood that such concepts are intended to be covered by the following claims unless these claims by their language expressly state otherwise.

It will be understood by one having ordinary skill in the art that construction of the described disclosure, and other components, is not limited to any specific material. Other exemplary embodiments of the disclosure disclosed herein may be formed from a wide variety of materials, unless described otherwise herein.

It will be understood by one having ordinary skill in the art that construction of the described disclosure, and other components, is not limited to any specific material. Other exemplary embodiments of the disclosure disclosed herein may be formed from a wide variety of materials, unless described otherwise herein.

For purposes of this disclosure, the term "coupled" (in all of its forms: couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature, or may be removable or releasable in nature, unless otherwise stated.

It is also important to note that the construction and arrangement of the elements of the disclosure, as shown in the exemplary embodiments, is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts, or elements shown as multiple parts may be integrally formed, the operation of the interfaces may be reversed or otherwise varied, the length or width of the structures and/or members or connector to other elements of the system may be varied, and the nature or numeral of adjustment positions provided between the element may be varied. It should be noted that the elements and/or assemblies of the system may be constructed from any of the wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes, or steps within described processes, may be combined with other disclosed processes or steps to form structures within the scope of the present disclosure. The exemplary structures and processes disclosed herein are for illustrative purposes and are not to be construed as limiting.

It is also to be understood that variations and modifications can be made on the aforementioned structures and methods without departing from the concepts of the present disclosure, and, further, it is to be understood that such concepts are intended to be covered by the following claims, unless these claims, by their language, expressly state otherwise. Further, the claims as set forth below, are incorporated into and constitute part of this Detailed Description.

What is claimed is:

1. A vehicle seating assembly comprising:
   a vehicle seat including a body having a center portion and four corner portions, said vehicle seat further including a seating surface;
   a supporting layer disposed below the body;
   a thermal transfer node disposed in the body and including a heat sink and a thermoelectric device, the heat sink located between the seating surface and the thermoelectric device, wherein the heat sink and the thermoelectric device are configured to draw heat away from the seating surface;
   a fluid moving proximate the thermal transfer node and into the supporting layer to draw heat away from the thermal transfer node;
   a phase change material disposed between the seating surface and the heat sink
   a column extending away from the thermal transfer node, through the body, and to the supporting layer; and
   a ventilated carrier disposed above the column.

2. The vehicle seating assembly of claim 1 wherein the heat sink is an upper heat sink and wherein the thermal transfer node further comprises a lower heat sink, the lower heat sink located between the thermoelectric device and the supporting layer, the upper heat sink and the lower heat sink being in a thermally conductive relationship with the thermoelectric device.

3. The vehicle seating assembly of claim 2 wherein the phase change material is a phase change patch.

4. The vehicle seating assembly of claim 3 further comprising:
   a thermally conductive patch, the thermally conductive patch located between the phase change patch and the seating surface.

5. The vehicle seating assembly of claim 1 wherein a fluid mover draws fluid from the supporting layer.

6. The vehicle seating assembly of claim 1, further comprising:
   a connection disposed between the column and the supporting layer.

7. The vehicle seating assembly of claim 1, wherein the column surrounds a structure for directing the fluid.

8. The vehicle seating assembly of claim 7 wherein the structure for directing the fluid includes a tube.

9. The vehicle seating assembly of claim 4 wherein the thermoelectric device is housed in an insulator wherein the insulator separates the upper heat sink and the lower heat sink.

10. The vehicle seating assembly of claim 1, wherein the ventilated carrier includes a recess for receiving a lower heat sink of the thermal transfer node.

11. The vehicle seating assembly of claim 6 wherein the column is compressible and made of a conductive material.

12. The vehicle seating assembly of claim 1 wherein the thermal transfer node, the ventilated carrier, and the column are a plurality of thermal transfer nodes, ventilated carriers, and columns, and wherein the plurality of thermal transfer nodes are connected to one another.

13. The vehicle seating assembly of claim 12 further comprising a vehicle seat back wherein the vehicle seat back includes a plurality of thermal transfer nodes, ventilated carriers, and columns that are connected to one another.

14. A vehicle seating assembly comprising:
   a vehicle seat including a body with a seating surface;
   a thermal transfer node, the thermal transfer node including a thermoelectric device;
   the thermoelectric device configured to change temperature when a voltage is applied to the thermoelectric device;
   a column extending through the body and away from the thermoelectric device;
   a tube disposed within the column and extending away from the thermoelectric device; and
   a ventilated carrier disposed between the tube and the thermoelectric device, wherein the column, the tube, and the ventilated carrier define a pathway for routing air to or from the thermoelectric device.

15. The vehicle seating assembly of claim 14 wherein the thermoelectric device includes an upper surface and a lower surface and wherein the thermoelectric device is able to use ambient air applied to the lower surface to heat or cool the upper surface.

16. The vehicle seating assembly of claim 15 further comprising:
   an upper heat sink between the thermoelectric device and the seating surface; and
   a lower heat sink adjacent the lower surface of the thermoelectric device wherein the upper heat sink and the lower heat sink are in a thermally conductive relationship with the thermoelectric device.

17. The vehicle seating assembly of claim 16 further comprising a phase change material wherein the phase change material is located between the upper heat sink and the seating surface.

* * * * *